(12) United States Patent
Nazar et al.

(10) Patent No.: US 9,548,802 B2
(45) Date of Patent: Jan. 17, 2017

(54) METHOD AND APPARATUS FOR MULTIPLE-INPUT MULTIPLE-OUTPUT OPERATION

(75) Inventors: Shahrokh Nayeb Nazar, Montreal (CA); Moon-il Lee, Farmingdale, NY (US); Robert L. Olesen, Huntington, NY (US); Manasa Raghavan, West Babylon, NY (US); Lakshmi R. Iyer, King of Prussia, PA (US); Benoit Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 362 days.

(21) Appl. No.: 13/571,800

(22) Filed: Aug. 10, 2012

(65) Prior Publication Data

US 2013/0039332 A1     Feb. 14, 2013

Related U.S. Application Data

(60) Provisional application No. 61/522,934, filed on Aug. 12, 2011.

(51) Int. Cl.
*H04W 4/00*     (2009.01)
*H04B 7/04*     (2006.01)

(52) U.S. Cl.
CPC .................. *H04B 7/0452* (2013.01)

(58) Field of Classification Search
CPC .................................................. H04B 7/0452
(Continued)

(56) References Cited

U.S. PATENT DOCUMENTS 8,437,300 B2* 5/2013 Nam et al. ................... 370/329
8,559,354 B2* 10/2013 Kwon ................... H04L 5/0023
  370/312

(Continued)

FOREIGN PATENT DOCUMENTS

JP       2009-200824 A2    9/2009
WO    WO 2010090415 A2 *  8/2010  ............... H04B 7/04

OTHER PUBLICATIONS

Third Generation Partnership Project, "Technical Specification Group Radio Access Network; Evolvled Universal Terrestrial Radio Access (E-UTRA); Multiplexing and Channel Coding (Release 10)," 3GPP TS 36.212 v10.2.0, Jun. 2011.

(Continued)

*Primary Examiner* — Guang Li
(74) *Attorney, Agent, or Firm* — Volpe and Koenig, P.C.

(57) ABSTRACT

A wireless transmit/receive unit (WTRU) receives a downlink transmission from an eNodeB including a plurality of spatial layers transmitted to a plurality of WTRUs paired for multi-user MIMO. The WTRU decodes the downlink transmission based on a corresponding WTRU-specific reference signal. WTRU-specific reference signals are multiplexed using a frequency and code division multiplexing. WTRU-specific reference signals for different sub-group of antenna ports are multiplexed onto different subcarriers in a frequency domain and the WTRU-specific reference signals of the same sub-group of antennas ports are multiplied by an orthogonal cover code. The resource elements used for the WTRU-specific reference signals on antenna ports in one sub-group may be muted on antenna ports in another subgroup. A WTRU may transmit the uplink demodulation reference signal without precoding. The number of resource blocks allocated for the demodulation reference signal may (Continued)

be greater than the number of resource blocks allocated for the payload.

16 Claims, 15 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 8,625,703 | B2* | 1/2014 | Ko ........................ | H04B 7/0639 375/133 |
| 8,665,930 | B2* | 3/2014 | Guo et al. ...................... | 375/220 |
| 8,750,251 | B2* | 6/2014 | Shin et al. ..................... | 370/334 |
| 2008/0225965 | A1* | 9/2008 | Pi et al. ......................... | 375/260 |
| 2009/0046582 | A1* | 2/2009 | Sarkar et al. .............. | 370/230.1 |
| 2009/0210766 | A1* | 8/2009 | Katayama et al. ........... | 714/748 |
| 2009/0225722 | A1* | 9/2009 | Cudak et al. ................. | 370/330 |
| 2010/0232384 | A1* | 9/2010 | Farajidana et al. ........... | 370/329 |
| 2010/0285810 | A1* | 11/2010 | Ko et al. ........................ | 455/450 |
| 2010/0296465 | A1* | 11/2010 | Hooli et al. ................... | 370/329 |
| 2010/0323709 | A1* | 12/2010 | Nam et al. ..................... | 455/450 |
| 2011/0085503 | A1* | 4/2011 | Nam et al. ..................... | 370/329 |
| 2011/0103296 | A1* | 5/2011 | Ji et al. .......................... | 370/315 |
| 2011/0111781 | A1* | 5/2011 | Chen et al. ................... | 455/507 |
| 2011/0142107 | A1* | 6/2011 | Pan et al. ...................... | 375/219 |
| 2011/0170435 | A1* | 7/2011 | Kim et al. ..................... | 370/252 |
| 2011/0188598 | A1* | 8/2011 | Lee et al. ....................... | 375/267 |
| 2011/0199986 | A1* | 8/2011 | Fong et al. ................... | 370/329 |
| 2011/0228735 | A1* | 9/2011 | Lee et al. ...................... | 370/329 |
| 2011/0244877 | A1* | 10/2011 | Farajidana et al. ......... | 455/452.2 |
| 2011/0249767 | A1* | 10/2011 | Chen ..................... | H04L 5/0051 375/295 |
| 2011/0252139 | A1* | 10/2011 | Bhattad et al. ............... | 709/226 |
| 2011/0268072 | A1* | 11/2011 | Lee et al. ...................... | 370/329 |
| 2011/0274059 | A1* | 11/2011 | Brown ................ | H04L 27/0008 370/329 |
| 2011/0281536 | A1* | 11/2011 | Lee et al. ....................... | 455/129 |
| 2011/0317657 | A1* | 12/2011 | Chmiel et al. ................ | 370/331 |
| 2012/0106374 | A1* | 5/2012 | Gaal ..................... | H04L 5/0048 370/252 |
| 2012/0113831 | A1* | 5/2012 | Pelletier ................ | H04L 5/0058 370/252 |
| 2012/0140753 | A1* | 6/2012 | Lee et al. ...................... | 370/338 |
| 2012/0275414 | A1* | 11/2012 | Hu ........................ | H04B 7/0452 370/329 |
| 2013/0039284 | A1* | 2/2013 | Marinier ................. | H04L 5/001 370/329 |

OTHER PUBLICATIONS

Third Generation Partnership Project, "Technical Specification Group Radio Access Network; Evolved Universal Terrestrial Radio Access (E-UTRA); Multiplexing and Channel Coding (Release 10)," 3GPP TS 36.212 v10.6.0, Jun. 2012.
Third Generation Partnership Project, "Technical Specification Group Radio Access Network; Evolved Universal Terrestrial Radio Access (E-UTRA); Physical Channels and Modulation (Release 10)," 3GPP TS 36.211 v10.2.0, Jun. 2011.
Third Generation Partnership Project, "Technical Specification Group Radio Access Network; Terrestrial Radio Access (E-UTRA); Physical Channels and Modulation (Release 10)," 3GPP TS 36.211 v10.5.0, Jun. 2012.
Third Generation Partnership Project, "Technical Specification Group Radio Access Network; Evolved Universal Terrestrial Radio Access (E-UTRA); Physical Layer Procedures (Release 10)," 3GPP TS 36.213 v10.2.0, Jun. 2011.
Third Generation Partnership Project, "Technical Specification Group Radio Access Network; Evolved Universal Terrestrial Radio Access (E-UTRA); Physical Layer Procedures (Release 10)," 3GPP TS 36.213 v10.6.0, Jun. 2012.
Dahlman et al., "4G: LTE/LTE-Advanced for Mobile Broadband," Academic Press, pp. 152-173 (Apr. 2011).
Fujitsu, "Discussion on DL MU-MIMO in Rel.11," 3GPP TSG-RAN1 #65, R1-111725 (May 9-13, 2011).
Huawei, "DCI discussion on transparent MU-MIMO," 3GPP TSG RAN WG1#61, R1-103103 (May 10-14, 2010).
Third Generation Partnership Project, "Technical Specification Group Radio Access Network; Evolved Universal Terrestrial Radio Access (E-UTRA); Multiplexing and Channel Coding (Release 10)," 3GPP TS 36.212 v10.2.0, Jun. 2011.
Third Generation Partnership Project, "Technical Specification Group Radio Access Network; Evolved Universal Terrestrial Radio Access (E-UTRA); Mutliplexing and Channel Coding (Release 10)," 3GPP TS 36.212 v10.6.0, Jun. 2012.
Third Generation Partnership Project, "Technical Specification Group Radio Access Network; Evolved Universal Terrestrial Radio Access (E-UTRA); Physical Channesl and Moduation (Release 10)," 3GPP TS 36.211 v10.2.0, Jun. 2011.
Third Generation Partnership Project, "Technical Specification Group Radio Access Network; Evolved Universal Terretrial Radio Access (E-UTRA); Physical Channels and Modulation (Release 10)," 3GPP TS 36.211 v10.5.0, Jun. 2012.
Third Generation Partnership Project, "Technical Specification Group Radio Access Network; Evolved Terrestrial Radio Access (E-UTRA); Physical Layer Procedures (Release 10)," 3GPP TS 36.213 v10.2.0, Jun. 2011.
Third Generation Partnership Project, "Technical Specification Group Radio Access Network; Evolved Universal Terrestrial Radio Access (E-UTRA); Physical Layer Procedures (Release 10)," 3GPP TS 36.213 v10.6.0, Jun. 2012.
Huawei et al., "SGH for MU-MIMO," 3GPP TSG RAN WG1 Meeting #62bis, R1-105143 (Oct. 11-15, 2010).
Nokia Siemens Networks et al., "UL DM RS for Multi-bandwidth Multi-user MIMO," 3GPP TSG RAN WG1 Meeting #51bis, R1-080293 (Jan. 14-18, 2008).
Nortel, "Further discussion UL RS for MU-MIMO," 3GPP TSG-RAN Working Group 1 Meeting #51bis, R1-080374 (Jan. 14-18, 2008).
Third Generation Partnership Project, "Technical Specification Group Radio Access Network; Evolved Universal Terrestrial Radio Access (E-UTRA); Physical Channels and Modulation (Release 10)," 3GPP TS 36.211 v10.5.0, Jun. 2012.
Third Generation Partnership Project, "Technical Specification Group Radio Access Network; Evolved Universal Terrestrial Radio Access (E-UTRA); Physical Layer Procedures (Release 10)," 3GPP TS 36.213 v10.2.0, Jun. 2011.
Huawei, "Dimensioning LTE-A MU-MIMO," 3GPP TSG RAN WG1 meeting #59, R1-094711, Jeju, Republic of Korea (Nov. 9-13, 2009).
Motorola, "DM-RS Ports / Scrambling Sequence Design for DL Single Cell MU-MIMO," 3GPP TSG RAN WG1 Meeting #61, R1-103185, Montreal, Canada (May 10-14, 2010).
Third Generation Partnership Project, "Technical Specification Group Radio Access Network; Further Advancements for E-UTRA Physical Layer Aspects (Release 9)," 3GPP TR 36.814 V0.4.1 (Feb. 2009).
Chairman, "Draft Agenda," 3GPP TSG RAN WG1 Meeting #69, R1-121925, Prague, Czech Republic, (May 21-25, 2012).
Ericsson et al, "Downlink demodulation RS design for Rel-9 and beyond," 3GPP TSG-RAN WG1 #58, R1-093485, Shenzhen, China (Aug. 24-28, 2009).
Huawei et al., "Proposal for specification of Pdsch Muting," 3GPP TSG RAN WG1 meeting #62bis, R1-105132, Xi'An, China (Oct. 11-15, 2010).
Interdigital Communications, LLC, "Reference Signals for ePDCCH," 3GPP TSG RAN WG1 Meeting #68, R1-120138, Dresden, Germany (Feb. 6-10, 2012).
Interdigital Communications, LLC, On ePDCCH Reference Signal, 3GPP TSG RAN WG1 Meeting #68bis, R1-121317, Jeju, Korea (Mar. 26-30, 2012).

(56) References Cited

OTHER PUBLICATIONS

NTT DOCOMO, "Chairman's Notes on RS for E-PDCCH," R1-120914, 3GPP TSG RAN WG1 Meeting #68, Dresden, Germany (Feb. 6-10, 2012).
Qualcomm Europe, "UE-RS Patterns for Rank 3-4," 3GPP TSG-RAN WG1 #58bis, R1-094211, Miyazaki, Japan (Oct. 12-16, 2009).
Qualcomm Inc., "Details of OCC mapping for DL MIMO operation," 3GPP TSG-RAN WG1 #62, R1-104795, Madrid, Spain (Aug. 23-27, 2010).
Renesas Mobile Europe Ltd., "Association of DM-RS for ePDCCHs within a PRB pair," 3GPP TSG RAN WG1 Meeting #68, R1-120385, Dresden, Germany (Feb. 6-10, 2012).

* cited by examiner

EVEN-NUMBERED ODD-NUMBERED
SLOTS SLOTS
ANTENNA PORT 7

EVEN-NUMBERED ODD-NUMBERED
SLOTS SLOTS
ANTENNA PORT 8

EVEN-NUMBERED ODD-NUMBERED
SLOTS SLOTS
ANTENNA PORT 9

EVEN-NUMBERED ODD-NUMBERED
SLOTS SLOTS
ANTENNA PORT 10

METHOD AND APPARATUS FOR MULTIPLE-INPUT MULTIPLE-OUTPUT OPERATION

CROSS REFERENCE TO RELATED APPLICATIONS

This application claims the benefit of U.S. provisional application No. 61/522,934 filed Aug. 12, 2011, the contents of which is hereby incorporated by reference herein.

BACKGROUND

The closed-loop precoding scheme in Long Term Evolution Advanced (LTE-A) is extended to support configuration with up to 8 transmit antennas in the downlink using a wireless transmit/receive unit (WTRU)-specific reference signal to improve data coverage. Since the WTRU-specific demodulation reference signal (DM RS) is precoded in the same way as the data, a non-codebook based precoding may be applied.

The orthogonality among the DM RS ports in the LTE Release 10 is achieved using a combination of code division multiplexing (CDM) and frequency division multiplexing (FDM). FIG. 17 shows a conventional WTRU-specific reference signal pattern for antenna ports 7, 8, 9, and 10 for normal cyclic prefix. Total 12 resource elements (REs) are used per layer for each subframe. Two CDM groups occupy different subcarriers in a frequency domain. In LTE Release 10, antenna ports 7, 8, 11, and 13 belong to CDM group 1, and antenna ports 9, 10, 12, and 14 belong to CDM group 2. For rank-1 to rank-4, a length-2 orthogonal cover code (OCC) is applied on two adjacent REs in each slot while for rank-5 to rank-8, a length-4 OCC is applied on two groups of consecutive REs in the subframe.

A WTRU receives information regarding the assigned DM RS antenna port(s), the scrambling identity, and the number of layers through downlink control information, (e.g., a 3-bit field in DCI format 2C as specified in Table 1). $n_{SCID}$ is the scrambling identity for antenna ports 7 and 8.

TABLE 1

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In LTE Release 10, for multi-user multiple-input multiple-output (MU-MIMO) operation, up to four layers can be simultaneously scheduled on the same frequency-time resources. This is accomplished through multiplexing of layers on two orthogonal DM RS antenna ports (antenna ports 7 and 8) with two scrambling sequences, $n_{SCID}=\{0,1\}$ (the shaded rows in Table 1).

SUMMARY

A method and apparatus for multiple-input multiple-output (MIMO) transmissions are disclosed. A wireless transmit/receive unit (WTRU) receives a downlink transmission from an eNodeB including a plurality of spatial layers transmitted to a plurality of WTRUs paired for multi-user MIMO. The WTRU decodes the downlink transmission based on a WTRU-specific reference signal. WTRU-specific reference signals for the plurality of WTRUs may be multiplexed into the downlink transmission such that WTRU-specific reference signals for different sub-group of antenna ports are multiplexed onto different subcarriers in a frequency domain and the WTRU-specific reference signals of the same sub-group of antennas ports are applied with an orthogonal cover code in a time domain. The resource elements used for transmission of the WTRU-specific reference signals on antenna ports in one sub-group may be muted on antenna ports in another sub-group. The WTRU may decode the downlink transmission assuming that no data is transmitted to the WTRU on the muted resource elements.

Four antenna ports with two scrambling sequences may be used to support up to eight (8) spatial layers. A bandwidth assigned for the WTRU may be different from a bandwidth assigned for a WTRU paired for multi-user MIMO. In this case, information regarding the largest bandwidth among WTRUs paired for multi-user MIMO may be provided to the WTRU.

In another embodiment, a WTRU may transmit the uplink demodulation reference signal without precoding.

In another embodiment, the number of resource blocks allocated for the uplink demodulation reference signal may be greater than the number of resource blocks allocated for the payload.

In another embodiment, the uplink demodulation reference signals from a plurality of WTRUs may be multiplexed in a frequency domain.

BRIEF DESCRIPTION OF THE DRAWINGS

A more detailed understanding may be had from the following description, given by way of example in conjunction with the accompanying drawings wherein.

DETAILED DESCRIPTION

Figure 1A:
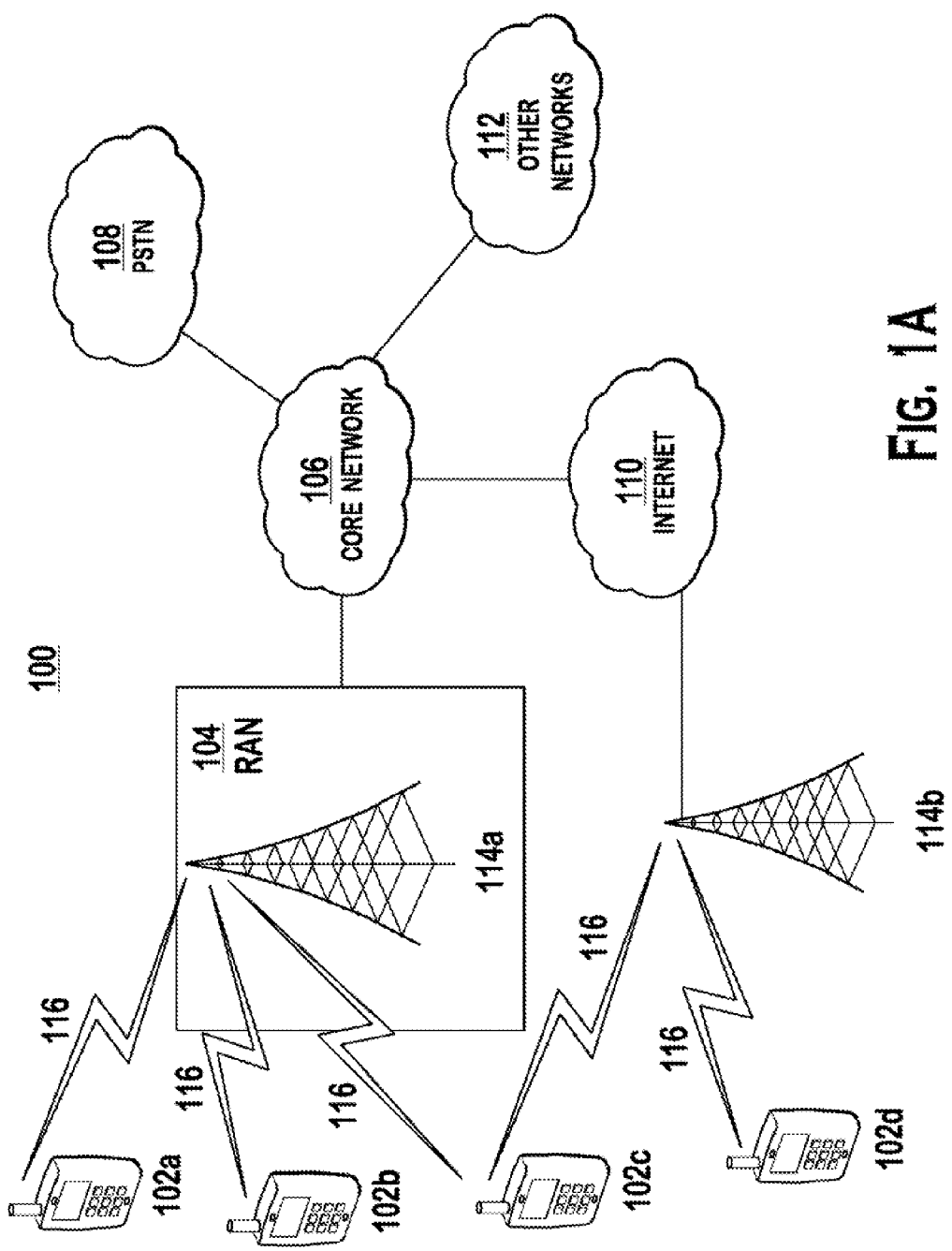
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
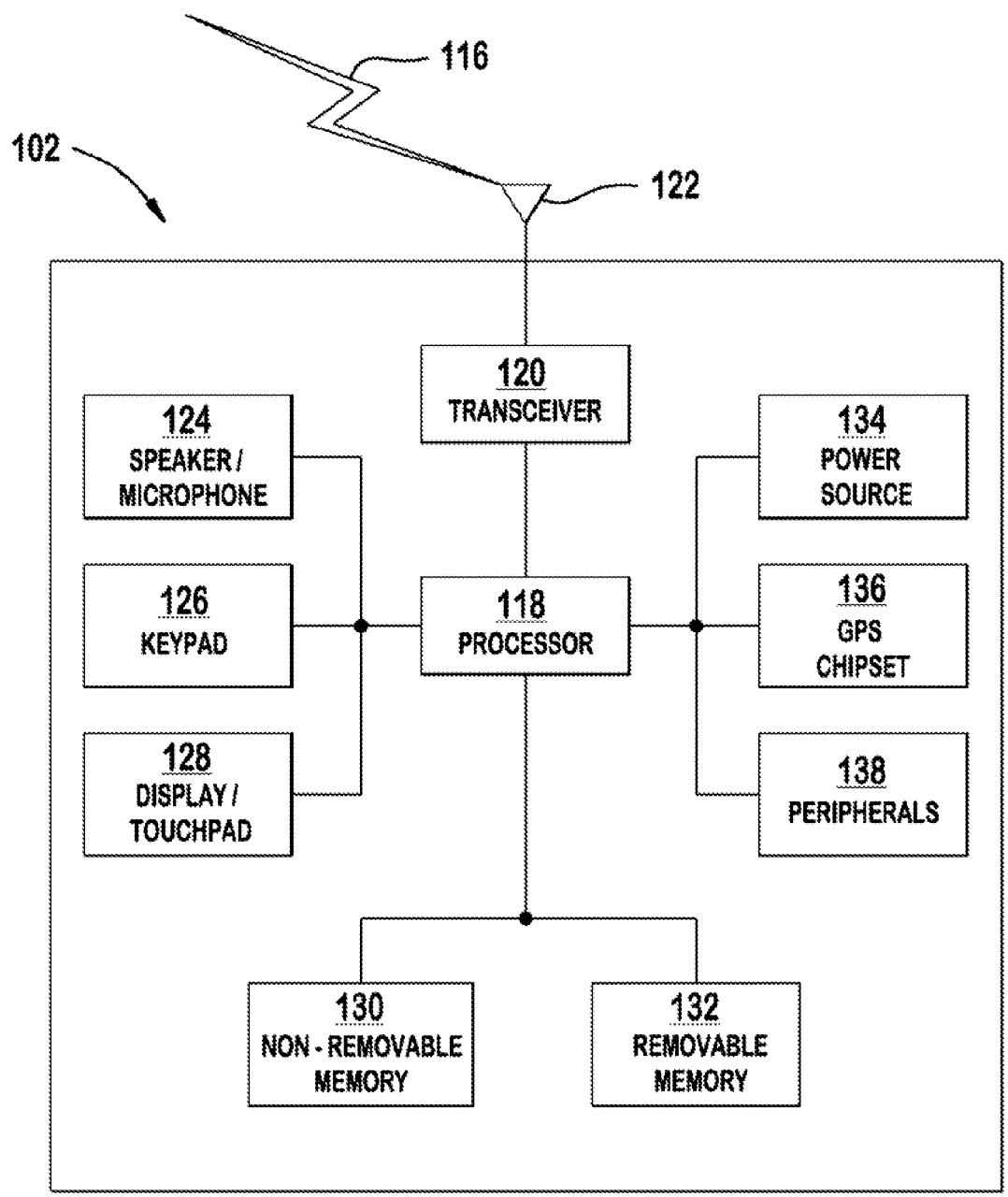
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, ITV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
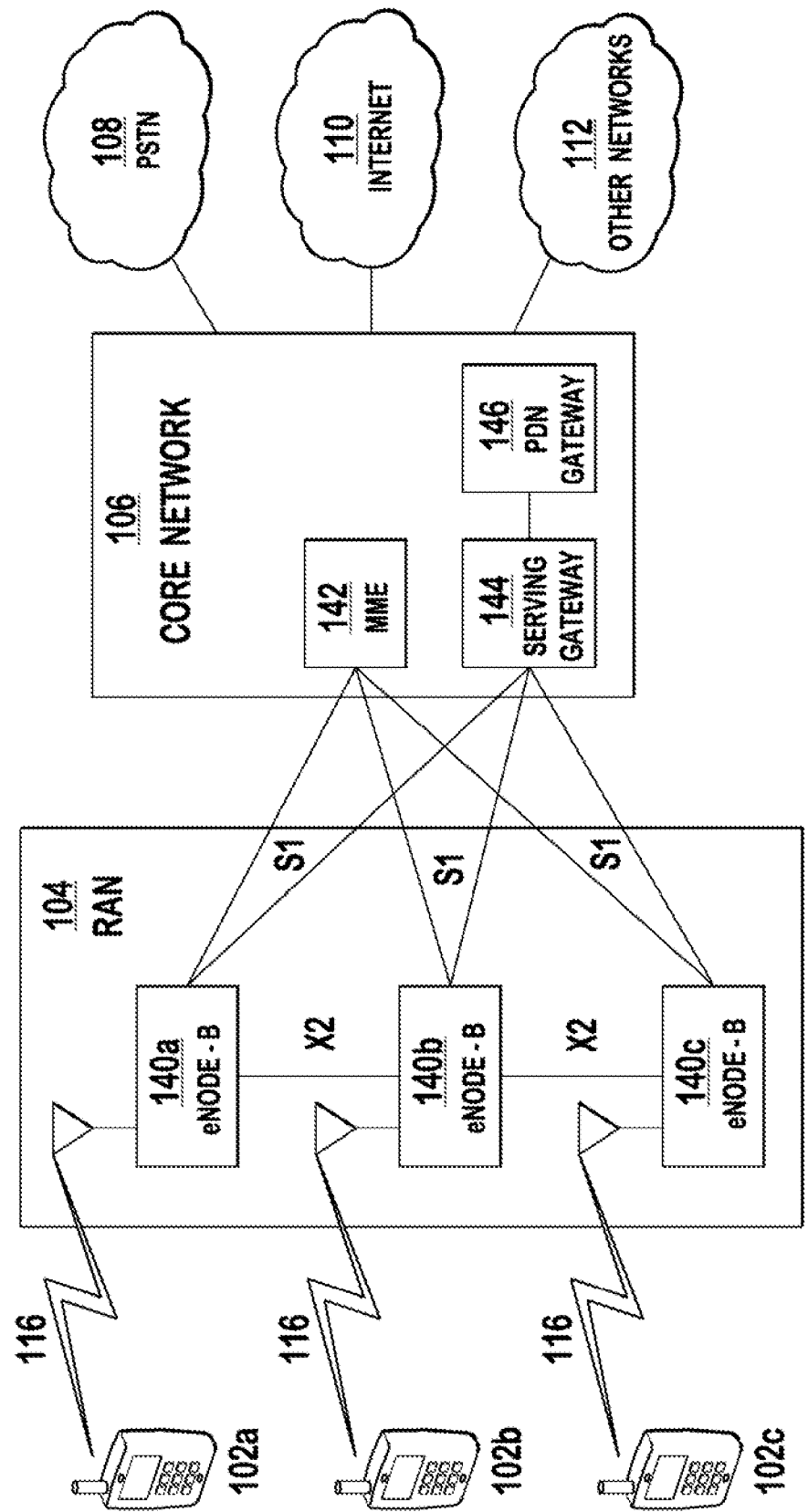
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Embodiments for downlink DM RS enhancements for MU-MIMO are disclosed hereafter.

MIMO implementations such as those with a macro-node with low power remote radio heads (RRH) may support more WTRUs within their respective coverage area. However, in case of MU-MIMO in LTE Release 10, which uses antenna ports 7 and 8 with two scrambling sequences, up to four layers may be co-scheduled on the same frequency-time resources (i.e., resource blocks). Out of these four layers two layers are fully orthogonal but the other two layers are quasi-orthogonal due to the use of the two scrambling sequences. This results in loss of orthogonality among the WTRUs which in turn adversely impacts system throughput.

In one embodiment, in order to improve orthogonality among the layers and increase the number of layers for MU-MIMO operation, a new set of DM RS ports may be defined for MU-MIMO operation. For example, the MU-MIMO operation may be performed using DM RS antennas ports 7, 8, 9, and 10, (i.e., both CDM group 1 (antenna ports 7 and 8) and CDM group 2 (antenna ports 9 and 10) may be used for MU-MIMO operation). With this embodiment, up to eight layers may be simultaneously co-scheduled for MU-MIMO operation with two scrambling sequences.

Figure 2:
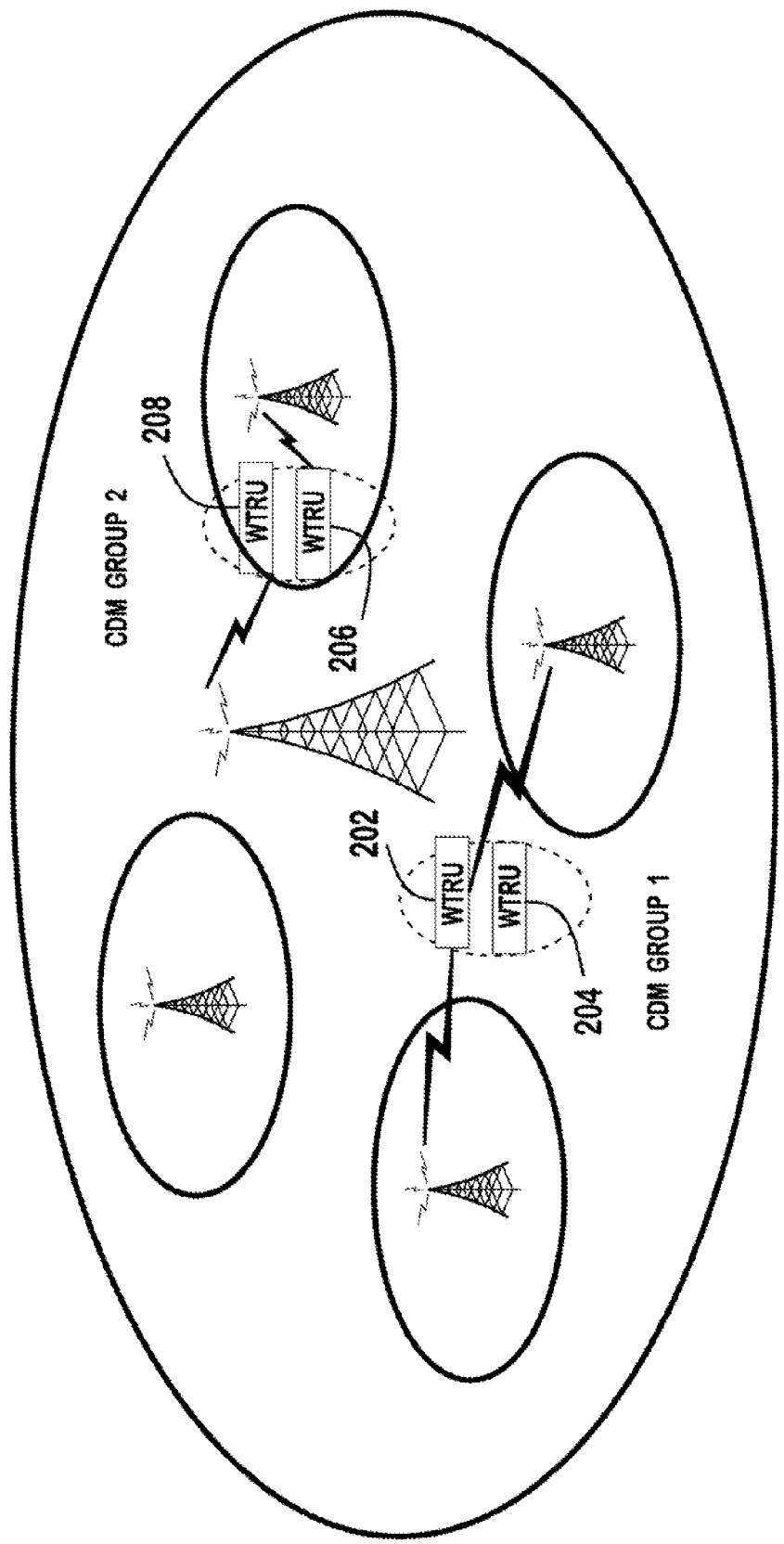
FIG. 2 shows an example of splitting WTRUs into two code division multiplexing (CDM) groups.

The eNodeB scheduler (or any other network node) may split the WTRUs for MU-MIMO operation into multiple (e.g., two) groups based on their spatial correlation, and assign each group of WTRUs to a different CDM group (i.e., the antenna ports that are multiplexed onto the same frequency resource using OCCs). The eNodeB may inform the WTRUs in each group their assigned DM RS CDM group either semi-statically or dynamically using layer 3, 2, or 1 signaling. FIG. 2 shows an example of splitting WTRUs into two CDM groups. In this example, WTRU 202 and WTRU 204 are grouped together and assigned to CDM group 1, and WTRU 206 and WTRU 208 are grouped together and assigned to CDM group 2 based on their spatial correlation.

A WTRU may be configured through a higher layer message or downlink control information (e.g., DCI Format 2C) regarding the assigned DM RS port(s). Table 2 shows an example for indicating the antenna port(s), the scrambling identity ($n_{SCID}$), and the number of layers for MU-MIMO operations in CDM group 2 using 3 bits in DCI format 2C. The WTRU decodes its downlink assignment and then identifies the assigned antenna ports, the scrambling identity, and the number of layers using the 3-bit field in its assignment as specified in Table 1 or Table 2.

TABLE 2

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 9, $n_{SCID}=0$ | 0 | 2 layers, ports 9-10, $n_{SCID}=0$ |
| 1 | 1 layer, port 9, $n_{SCID}=1$ | 1 | 2 layers, ports 9-10, $n_{SCID}=1$ |
| 2 | 1 layer, port 10, $n_{SCID}=0$ | 2 | 3 layers, ports 7-9 |
| 3 | 1 layer, port 10, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Figure 3:
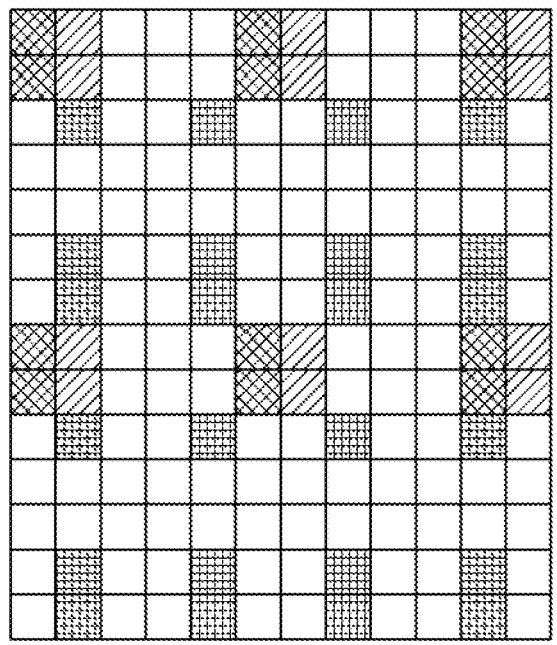
FIG. 3 shows an example for demodulation reference signal (DM RS) muting for MU-MIMO operation up to 8 layers.
Figure 3:
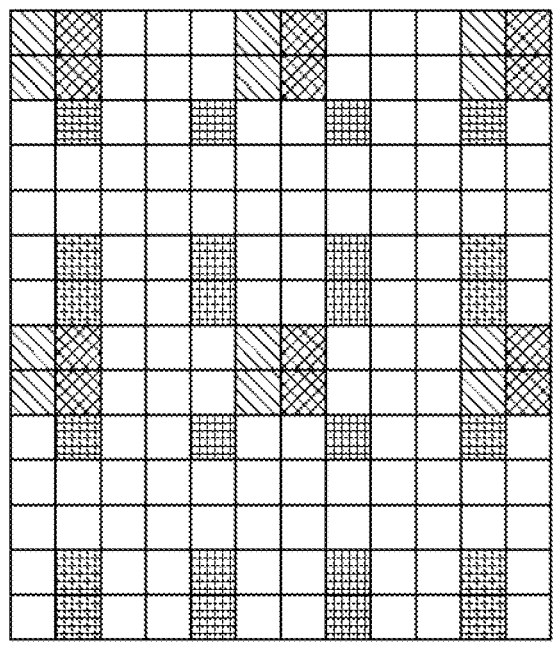

In one embodiment, in order to improve orthogonality among co-scheduled WTRUs within a CDM group and facilitate channel estimation at the WTRUs, DM RS muting may be employed. FIG. 3 shows an example for DM RS muting for MU-MIMO operation up to 8 layers. As shown in FIG. 3, the resource elements used for transmission of WTRU-specific reference signals on antenna ports in CDM group 1 may not be used for any transmissions on antenna ports in CDM group 2, and vice versa.

In this embodiment, the WTRU may assume that rate matching of data is performed around the resource elements allocated for DM RS ports for the MU-MIMO (e.g., antenna ports 7, 8, 9, and 10), even though the WTRU employs the assigned DM RS ports within one CDM group for channel estimation (e.g., either DM RS ports {7,8} or {9, 10}). The WTRU may decode the downlink transmission assuming that no data is transmitted to the WTRU on the muted resource elements. In this embodiment, in case an antenna port p is used (p∈{7,8,9,10}), the WTRU may not assume that the other antenna ports in the set {7,8,9,10} are not associated with transmission of PDSCH to another WTRU.

In LTE Release 10, in order to maintain orthogonality among co-scheduled WTRUs for MU-MIMO, the transmission bandwidth of those WTRUs paired for MU-MIMO operation is identical when the same DM RS port is used for both WTRUs. In other words, unequal DL resource allocation for MU-MIMO operation for more than two WTRUs is not possible in LTE Release 10. This reduces scheduling flexibility which in turn negatively impacts the achievable cell throughput.

In one embodiment, the MU-MIMO operation may be performed with unequal bandwidths, (i.e., resources of unequal bandwidth may be allocated to the WTRUs paired for MU-MIMO). In order to enhance MU-MIMO operation, the largest transmission bandwidth among those WTRUs paired for MU-MIMO operation may be signaled to all co-scheduled WTRUs within the same CDM group. The WTRU may use this information to generate the scrambling sequence applied on the DM RS, improve the interference measurement based on the knowledge of the MU-MIMO co-scheduled interferer, calculate the channel state information (CSI) feedback by taking into account the interference caused by the MU-MIMO co-scheduled WTRU, enhance channel estimation using the DM RS information of the MU-MIMO co-scheduled interferer, and the like.

$N_{RB}^{PDSCH}$ denotes the bandwidth in physical resource blocks of the corresponding PDSCH transmission expressed in the number of RBs. Assuming K WTRUs are co-scheduled for MU-MIMO operation, the WTRU may be provided, either through high layer signaling or downlink control information (DCI), with an additional parameter $N_{RB}^{max, PDSCH}$ for the largest bandwidth among the WTRUs paired for MU-MIMO, which may be derived by the following: $\text{Max}\{N_{RB,0}^{PDSCH}, N_{RB,1}^{PDSCH}, \ldots, N_{RB,K}^{PDSCH}\}$. $N_{RB,k}^{PDSCH}$ denotes the total number of allocated physical resource blocks to the k-th co-scheduled WTRU for the MU-MIMO operation.

Support for MU-MIMO operation with unequal bandwidth allocation requires separation of the DM RS of the WTRUs paired for MU-MIMO. In case the WTRUs are assigned the same DM RS port, in order to maintain the orthogonality among the co-scheduled layers, the scrambling function on the WTRU-specific reference signal may be disabled for MU-MIMO operation with unequal bandwidth allocation. Disabling the scrambling for the WTRU-specific reference signals may be done by higher layer or any other signaling in a WTRU-specific manner.

Since MU-MIMO operation may not be used for cell edge WTRUs, the inter-cell interference due to the absence of scrambling may not be the limiting factor for the performance of the co-scheduled MU-MIMO WTRUs. In case of severe inter-cell interference, the location of WTRU-specific reference signal resource elements may be shifted in a cell-specific manner in the frequency or time domain. For example, in case the antenna ports used for transmission of WTRU-specific reference signals to one WTRU belong to the set S, where S={7,8,11,13} or S={9,10,12,14}, the resource elements for transmission of the WTRU-specific reference signals may be shifted in the frequency domain according to $v_{shift}=N_{ID}^{cell} \mod 4$, where $N_{ID}^{cell}$ is the physical layer cell identity.

Embodiments for enhancing the uplink DM RS are disclosed hereafter.

In LTE-A, the uplink DM RS sequences are derived from Zadoff-Chu (ZC) or computer-generated sequences. They have excellent auto-correlation properties and near-constant amplitude in the time and frequency domain. Cyclic shifts of a DM RS sequence are mutually orthogonal, and well-tailored for multiplexing. In LTE Release 8, cyclically shifted DM RS sequences are employed to support MU-MIMO when multiple WTRUs are co-scheduled with equal bandwidth allocation. Inter-cell interference is further randomized by employing sequence group hopping (SGH) within a cell to change the base sequence for the DM RS every slot. This randomizes the cross-correlation with the DM RS of the interferers from neighboring cells and enables inter-cell interference mitigation. However, due to the cross-correlation effects, LTE Release 8 may not support MU-MIMO with flexible resource allocations wherein unequal lengths of DM RS sequences may be multiplexed.

LTE-A Release 10 introduces a provision to facilitate flexible scheduling for MU-MIMO. SGH may be disabled for some WTRUs in a WTRU-specific manner to make the DM RS sequences identical in the two slots of a subframe and then an orthogonal cover code (OCC) of length-2 may be applied across the DM RS symbols within a subframe. This scheme increases the multiplexing capacity of the resources by a factor of 2. With SGH disabled, MU-MIMO WTRUs with different OCCs have orthogonality on the DM RS regardless of their bandwidth allocations. However, disabling SGH increases inter-cell interference from a neighboring cell WTRU.

In one embodiment, the uplink DM RS of the WTRUs may be multiplexed in a frequency domain. If the WTRUs are assigned different frequency offsets, their DM RS's are orthogonal and may be multiplexed. The multiplexing may be between intra-cell WTRUs and/or inter-cell WTRUs. If the constant amplitude zero autocorrelation (CAZAC) properties of the DM RS need to be preserved, the DM RS sequence may be derived from the conventional LTE Release 8/10 sequences (referred to as "base sequence" hereafter) by uniformly up-sampling an appropriate base sequence with a suitable repetition factor (RPF). The LTE Release 8/10 bases sequences are all multiples of 12.

Figure 4:
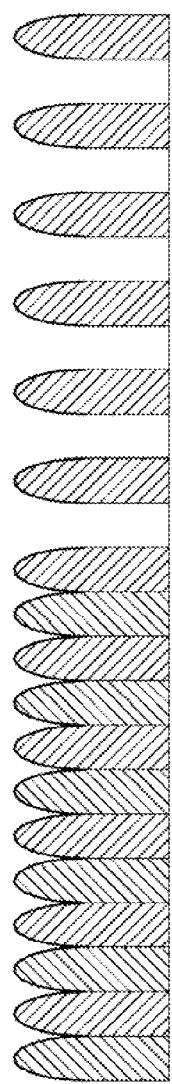
FIG. 4 shows an example DM RS of two WTRUs with different number of resources blocks multiplexed with a repetition factor (RPF) of 2.
Figure 5:
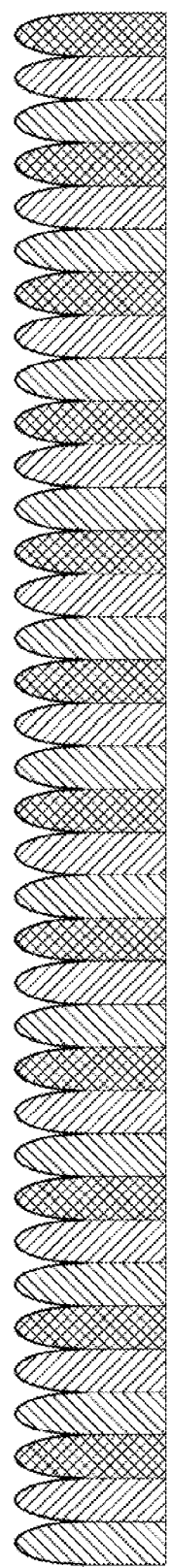
FIG. 5 shows an example DM RS of three WTRUs with the same number of resource blocks multiplexed with a RPF of 3.

FIG. 4 shows an example DM RS of two WTRUs with different number of resources blocks (1 and 2 RBs in this example) multiplexed with a RPF of 2. FIG. 5 shows an example DM RS of three WTRUs with the same number of resource blocks (3 RBs in this example) multiplexed with a RPF of 3.

The WTRU may derive the base sequence length from its RB allocation and the RPF. If the number of allocated resource blocks (N) is an integer multiple of the RPF, the WTRU may up-sample the base sequence of length 12N/RPF to derive the DM RS sequence. For example, for RPF=2 and an allocation of 10 RBs, the WTRU may derive its DM RS sequence by up-sampling by a factor of 2 a base sequence of length 60 (=12×5/2).

If the number of allocated RBs (N) is not an integer multiple of the RPF, the DM RS may be derived by either cyclically extending or truncating an up-sampled base sequence closest in length to 12N/RPF, or cyclically extending or truncating an up-sampled base sequence of length equal to the closest prime number. Currently, in LTE-A, the length of the base sequence for DM RS is a multiple of 12. This embodiment will relax the requirement and allow more flexible allocations of DM RS lengths.

The frequency multiplexing scheme reduces the number of REs for the UL DM RS. This introduces a loss of power compared to LTE Release 10. In order to compensate, the WTRU may transmit the DM RS with more power. For example, for RPF=2, a WTRU may double the amplitude (power boost of 6 dB) of its DM RS signal while keeping its payload at a nominal power level.

The RPF on the DM RS and the WTRU frequency offsets may be fixed or configurable and may be based on the WTRU ID, the cell ID, or both. The frequency offset for a WTRU may change every slot or every subframe. The frequency offset pattern may be based on the WTRU ID, the cell ID, or both.

The WTRUs may be flexibly assigned to operate in the frequency division multiplexed mode in accordance with the embodiment above or the LTE Release 10 mode (i.e., DM RS without frequency division multiplexing), for example, through higher layer signaling or L1 signaling.

When SGH is disabled and WTRUs are multiplexed through the OCCs, an inter-cell WTRU with the same OCC may cause a high level of interference. The interference may be mitigated by introducing different relative frequency shifts ($\Delta$) to the DM RS sequences of an interfering WTRU(s).

Figures 6A, 6B:
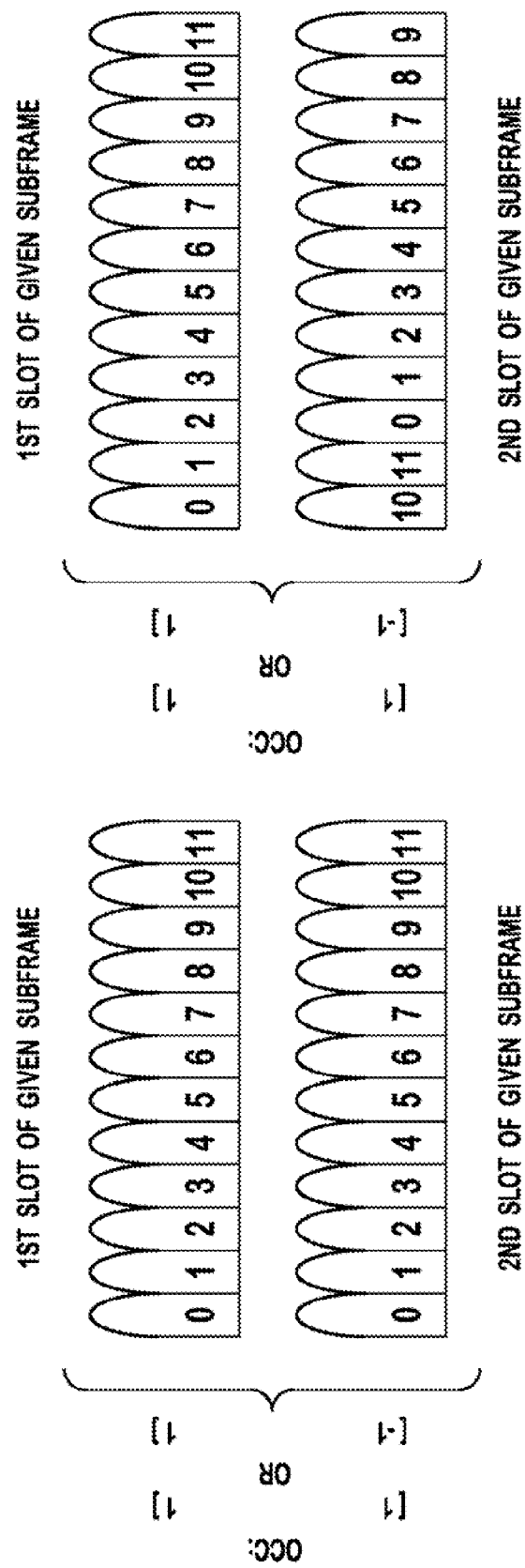
FIGS. 6A and 6B show an example of employing the relative frequency shifts to the DM RS.

FIG. 6B shows an example of employing the relative frequency shifts ($\Delta=2$) to the DM RS. In the LTE Release 10 scheme, as shown in FIG. 6A, the DM RS sequence in the second slot of a subframe is identical as SGH is disabled. An OCC of either [1 1] or [1 −1] may be applied to the sequences in two slots of the subframe.

In accordance with the embodiment, a relative shift of $\Delta$ is introduced in the DM RS sequences between the two slots in a subframe as shown in FIG. 6B. In FIG. 6B, the DM RS in the second slot of the subframe is the same as that in the first slot except for a cyclic shift of 2.

If the relative shift ($\Delta$) is different between the interfering WTRUs, the energy in interference may not be added coherently and as a consequence the interference may be reduced. The relative shift ($\Delta$) may change across subframes and may be derived from the WTRU ID and/or the cell ID. The network may implement this embodiment to all WTRUs in a cell or a subset of WTRUs.

In LTE Release 10, the DM RS OCCs are derived from the cyclic shift field (cyclicShift) in uplink-related DCI format. In one embodiment, the OCC may be derived as a function of time (e.g., the OCC may change across subframes). Alternatively or additionally, the OCC may be derived based on the WTRU ID and/or the cell ID. This will randomize the interferers across the layers for the WTRU.

Figures 7A, 7B:
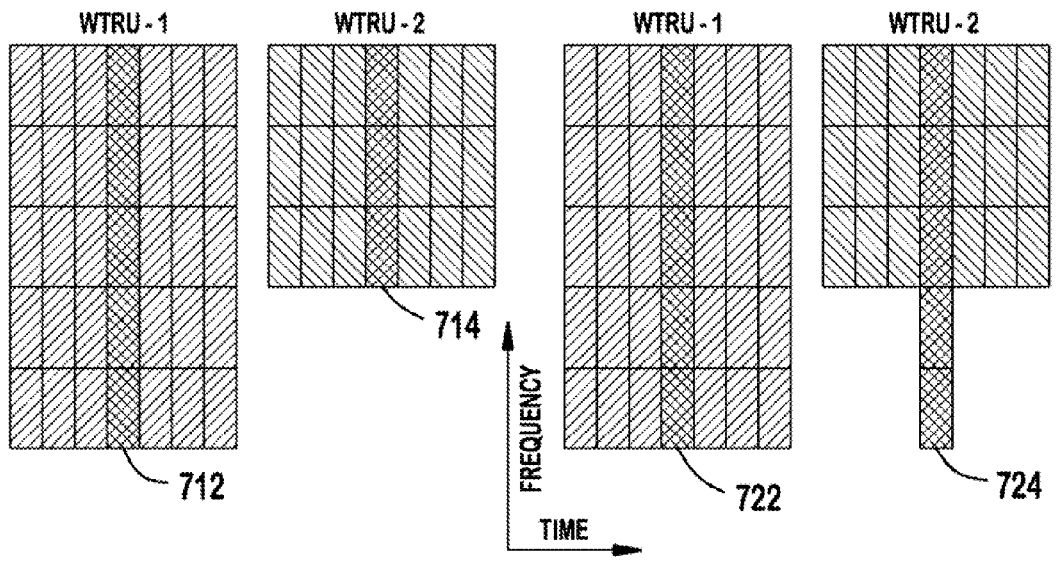
FIG. 7A shows resource allocation of DM RS in MU-MIMO users in accordance with conventional method.
FIG. 7B shows an example resource allocation of DM RS in MU-MIMO users in accordance with one embodiment.

When MU-MIMO WTRUs have different resource allocations, their DM RS sequences are of different lengths and consequently have poor cross-correlation properties. In accordance with one embodiment, the MU-MIMO WTRUs may have different resource allocations of payload (e.g., PUSCH+uplink control information (UCI)) but they may be assigned DM RS sequences of length corresponding to the larger resource allocation. Differences in the cyclic shifts of the sequences of the WTRUs may ensure orthogonality. In this case, the DM RS may be used for sounding. In accordance with this embodiment, SGH may not be disabled, thereby providing more robustness to inter-cell interference. FIG. 7A shows resource allocation of DM RS in MU-MIMO users in accordance with conventional method. FIG. 7B shows an example resource allocation of DM RS in MU-MIMO users in accordance with this embodiment. In FIG. 7A, the DM RS 712, 714 for different WTRUs with different amount of resource allocation are from different base sequences of different length and are not orthogonal. In FIG. 7B, the DM RS 722, 724 for different WTRUs with different amount of resource allocation are from the same base sequence of the same length with different cyclic shifts and are orthogonal.

Embodiments for using DM RS for sounding are disclosed hereafter.

In LTE-A, the sounding resource signal (SRS) is used to enable channel sounding at the eNodeB. Channel sounding is performed to estimate a precoding matrix indicator (PMI) and a rank, and to perform frequency selective scheduling (FSS), etc. In LTE Release 8, when a WTRU is scheduled for sounding, it transmits the SRS in the last SC-FDMA symbol of a subframe using its assigned resources (periodicity, transmission comb, transmission bandwidth, cyclic shift, etc.). In LTE Release 8, which supports a single layer per WTRU and a single single-input multiple-output (SIMO) transmission mode, the DM RS may be used for channel sounding in addition to channel estimation for demodulating the payload. In other words, the DM RS may play the role of the SRS.

However, LTE Release 10 limits the role of DM RS in sounding. LTE Release 10 supports multi-layer transmission modes wherein a DM RS resource is applied to each layer, not per transmit antenna. Consequently, the DM RS can be used to sound the composite channel at the receiver (pre-coded channel), not the individual channels (for every transmit-receive antenna pair) whose knowledge is a prerequisite for meaningful layer 1 feedback. Currently, the individual channels may not be derived from the composite channel estimates.

In one embodiment, a non-precoded DM RS may be used on the UL so that every transmit-receive link may be estimated by the eNodeB. A DM RS resource may be allocated for every transmit antenna. When the number of antennas is greater than the number of transmitted layers, more DM RS resources would be used than does in LTE Release 10. A non-precoded DM RS may be configured by semi-static signaling (e.g., RRC signaling) or by a dynamic indication (e.g., a modified DCI format 4).

Figure 8:
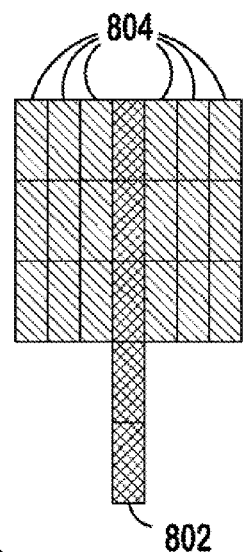
FIG. 8 shows an example resource allocation for the DM RS and the physical uplink shared channel (PUSCH) payload in accordance with one embodiment.

Conventionally, the number of physical resource blocks (PRBs) allocated for the DM RS is the same as that allocated for the payload (e.g., PUSCH payload). In one embodiment, if the DM RS-based sounding is performed, the DM RS allocation may be independent of the allocation for the payload. FIG. 8 shows an example resource allocation for the DM RS and the PUSCH payload in accordance with one embodiment. In FIG. 8, the DM RS (the middle SC-FDMA symbol 802) has a larger bandwidth than the payload (the remaining SC-FDMA symbols 804). The resource allocation for the DM RS may be indicated via higher layer signaling (e.g., RRC) or layer 1 or 2 signaling when the WTRU is scheduled for sounding. In a special case, a DM RS may be scheduled for sounding without PUSCH allocation.

The number of required resources may increase with non-precoded DM RS. In one embodiment, more DM RS sequences may be configured for a cell by assigning an additional cell ID(s) ($N_{ID}^{cell}$) to the cell. $N_{ID}^{cell}$ is a physical layer cell identity. For example, the network may assign an additional set of DM RS sequences to the cells by providing an offset δ to the $N_{ID}^{cell}$. Each cell may have DM RS resources corresponding to both its $N_{ID}^{cell}$ and $N_{ID}^{cell}$+δ. The DM RS sequences generated from the two cell IDs may be orthogonalized by using OCCs across the two slots within the subframe with SGH disabled.

The above embodiment may be used to interleave the DM RS resources in both SU-MIMO and MU-MIMO when sounding with DM RS.

The WTRU may use time division multiplexing of its DM RS resource across the time slots within a subframe. For example, the WTRU may allocate a resource to a first antenna in slot 1 of a subframe and no resource to a second antenna in the same slot, while the WTRU may allocate a resource to the second antenna in slot 2 and no resource to the first antenna in slot 2.

In another embodiment, precoded DM RS may be used for sounding and the individual channels may be computed from the composite pre-coded channels at the receiver (e.g., eNodeB). If different PMIs are used in successive transmissions within the coherence time of the channel, the receiver may compute the individual channels for sounding from its estimates of the composite channels. A WTRU may be configured to transmit different PMIs successively for sounding purposes. The sequence of PMIs used by the WTRU may be configured by the higher layers or it may be derived from the WTRU ID, the cell ID, or the like. In TDD, the channels may be estimated based on reciprocity. In FDD, statistics such as channel correlation on the DL may be used with reciprocity on the UL.

Figure 9:
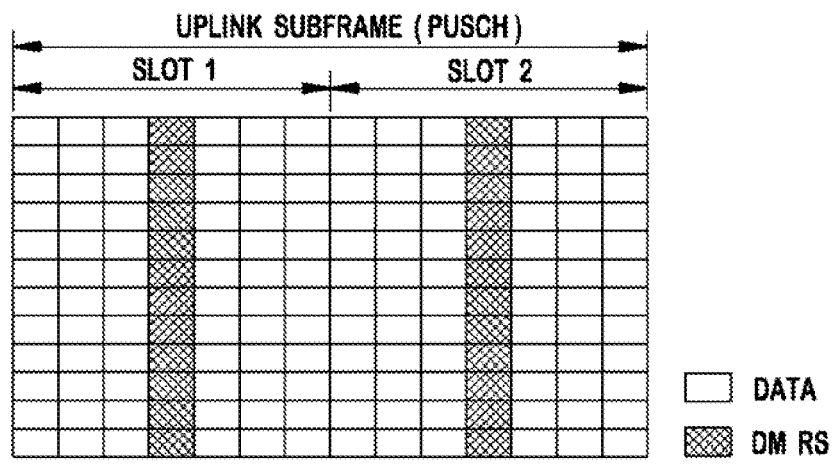
FIG. 9 shows a conventional uplink DM RS structure for a PUSCH.

FIG. 9 shows a conventional uplink DM RS structure for a PUSCH. The DM RS allocation is TDM-based with a cyclic shift. Due to the TDM-based DM RS structure, the channel estimation accuracy may be degraded as a Doppler frequency becomes higher and/or a modulation order becomes higher. In addition, the DM RS SC-FDMA symbol is located in the middle of the slot, thus requiring extrapolation to obtain channel status information for the SC-FDMA symbols in the subframe boundary. This may lead demodulation performance degradation in high mobility case and higher modulation order.

Table 3 shows cyclic shift allocation and OCC mapping for uplink DM RS. In this case, up to four layers may be multiplexed with a different cyclic shift and an OCC and this may help to keep the orthogonality between layers or multiple users.

TABLE 3

| Signaling bit | Cyclic Shift(α) | | | | OCC(w) | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 9 | 3 | [+1 +1] | [+1 +1] | [+1 −1] | [+1 −1] |
| 001 | 6 | 0 | 3 | 9 | [+1 −1] | [+1 −1] | [+1 +1] | [+1 +1] |
| 010 | 3 | 9 | 6 | 0 | [+1 −1] | [+1 −1] | [+1 +1] | [+1 +1] |
| 011 | 4 | 10 | 7 | 1 | [+1 +1] | [+1 +1] | [+1 +1] | [+1 +1] |
| 100 | 2 | 8 | 5 | 11 | [+1 +1] | [+1 +1] | [+1 +1] | [+1 +1] |
| 101 | 8 | 2 | 11 | 5 | [+1 −1] | [+1 −1] | [+1 −1] | [+1 −1] |
| 110 | 10 | 4 | 1 | 7 | [+1 −1] | [+1 −1] | [+1 −1] | [+1 −1] |
| 111 | 9 | 3 | 0 | 6 | [+1 +1] | [+1 +1] | [+1 −1] | [+1 −1] |

Figure 10:
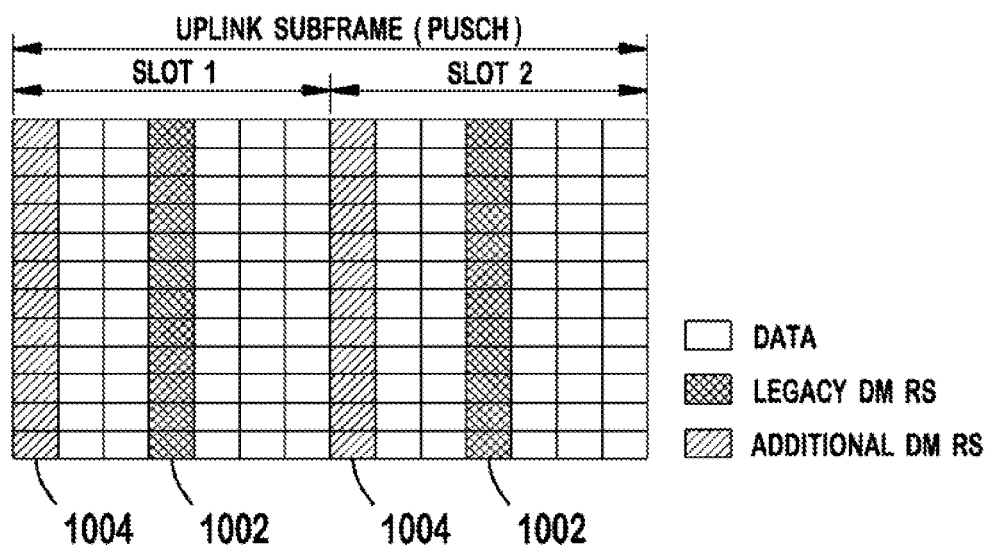
FIG. 10 shows an example for the DM RS structure for a PUSCH defined as a combination of the legacy DM RS and the additional DM RS.

In order to keep the orthogonality with legacy WTRUs (i.e., LTE Releases 8, 9, and 10) for multi-user MIMO, the DM RS pattern and multiplexing may be maintained as in the previous LTE Releases. Given this restriction, an additional DM RS may be added on top of the legacy DM RS in order to improve the channel estimation accuracy, (e.g., under the high Doppler frequency). FIG. 10 shows an example for the DM RS structure for a PUSCH which is defined as a combination of the legacy DM RS 1002 and the additional DM RS 1004. The same cyclic shifts and OCCs may be used for the additional DM RS 1004.

Figure 11:
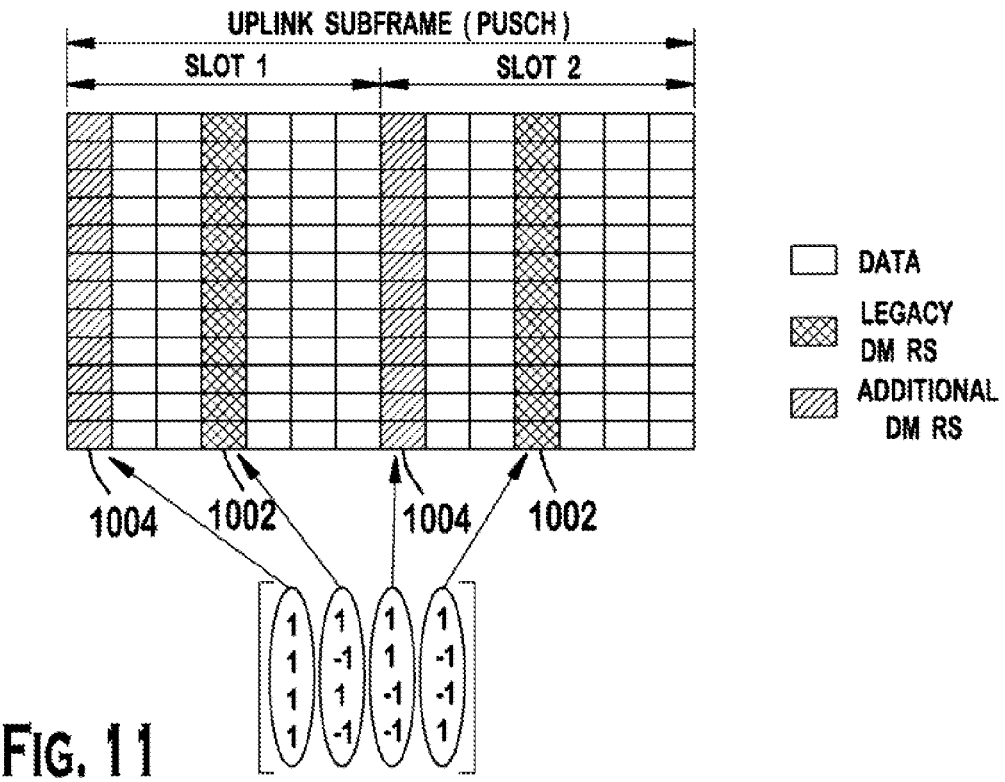
FIG. 11 shows an example uplink (UL) DM RS structure with the length-4 OCC mapping.

In another embodiment, a length-4 OCC may be used over the legacy DM RS 1002 and the additional DM RS 1004 instead of a length-2 OCC to increase the number of orthogonal reference signals for better support of multi-user MIMO and uplink cooperative multipoint transmission (CoMP). Although the length-4 OCC is used, the backward compatibility may be maintained as far as the same OCC is used for legacy DM RS 1002. FIG. 11 shows an example UL DM RS structure with the length-4 OCC mapping. Since the length-2 OCC is a subset of the length-4 OCC, the subset is used for the legacy DM RS to keep the backward compatibility.

Table 4 shows an example length-4 OCC mapping while keeping the legacy DM-RS length-2 OCC mapping as in the previous LTE Releases. Since the additional DM RS 1004 is not orthogonal with the legacy WTRU when co-scheduled in the same time and frequency resources, the length-4 OCC may not be used with the legacy WTRU for multi-user MIMO transmission.

TABLE 4

| Signaling bit | OCC(w) for legacy DM RS | | | | OCC(w) for additional DM RS | | | |
|---|---|---|---|---|---|---|---|---|
| | λ = 0 | λ = 1 | λ = 2 | λ = 3 | λ = 0 | λ = 1 | λ = 2 | λ = 3 |
| 000 | [+1 +1] | [+1 +1] | [+1 −1] | [+1 −1] | [+1 +1] | [−1 −1] | [+1 −1] | [−1 +1] |
| 001 | [+1 −1] | [+1 −1] | [+1 +1] | [+1 +1] | [+1 −1] | [−1 +1] | [+1 +1] | [−1 −1] |
| 010 | [+1 −1] | [+1 −1] | [+1 +1] | [+1 +1] | [+1 −1] | [−1 +1] | [+1 +1] | [−1 −1] |
| 011 | [+1 +1] | [+1 +1] | [+1 +1] | [+1 +1] | [+1 +1] | [−1 −1] | [+1 +1] | [−1 −1] |
| 100 | [+1 +1] | [+1 +1] | [+1 +1] | [+1 +1] | [+1 +1] | [−1 −1] | [+1 +1] | [−1 −1] |
| 101 | [+1 −1] | [+1 −1] | [+1 −1] | [+1 −1] | [+1 −1] | [−1 +1] | [+1 −1] | [−1 +1] |
| 110 | [+1 −1] | [+1 −1] | [+1 −1] | [+1 −1] | [+1 −1] | [−1 +1] | [+1 −1] | [−1 +1] |
| 111 | [+1 +1] | [+1 +1] | [+1 −1] | [+1 −1] | [+1 +1] | [−1 −1] | [+1 −1] | [−1 +1] |

Since the legacy DM RS structure is kept, the legacy WTRU performance for multi-user MIMO may be kept as well. On the other hand, a WTRU using the DM RS pattern of FIG. 10 may have different channel estimation accuracy according to the DM RS type. For instance, the channel estimation from the legacy DM RS may be better than that from the additional DM RS since the additional DM RS is not orthogonal with the PUSCH symbol for other co-scheduled WTRU. In this case, the eNodeB may allocate higher power for the additional DM RS and the power difference between the legacy DM RS and the additional DM RS may be informed to a WTRU, for example, by higher layer signaling.

Due to the introduction of the additional DM RS, the reference signal overhead becomes doubled as compared to the previous LTE Releases. This may lead to WTRU throughput performance loss. In order to lower the reference signal overhead, interlaced allocation for the additional DM RS may be used as shown in FIG. 12.

Figure 12:
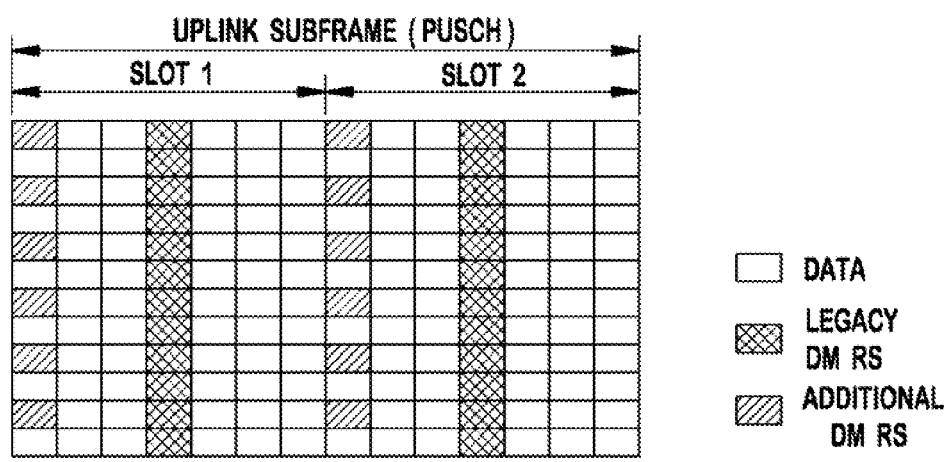
FIG. 12 shows an example UL DM RS structure with interlaced allocation of the additional DM RS.

It should be noted that even though FIGS. 10-12 show that the additional DM RS is located in the first SC-FDMA symbol in each slot, the time location of the additional DM RS may be changed to other SC-FDMA symbol in each slot (e.g., the sixth or seventh SC-FDMA symbol). In addition, the additional DM RS position may vary in each slot.

Figure 13A:
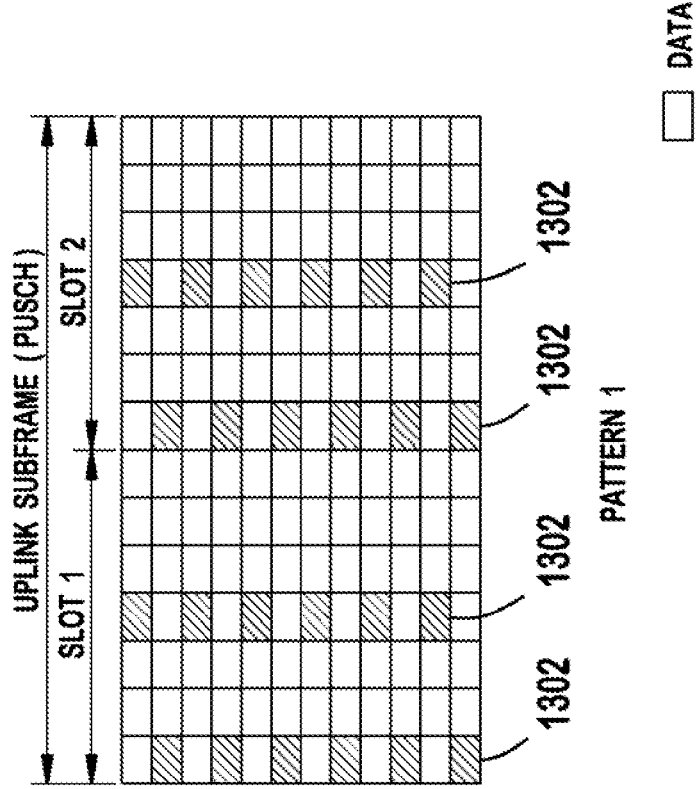
FIGS. 13A and 13B show two example DM RS patterns in accordance with one embodiment.
Figure 13B:
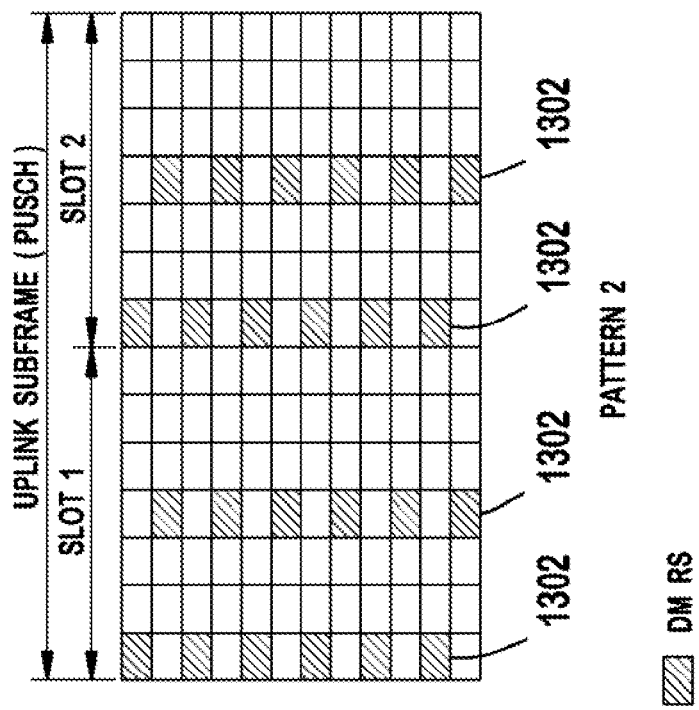

In another embodiment, the DM RS pattern may designed differently. FIGS. 13A and 13B show two example DM RS patterns in accordance with one embodiment. As shown in FIGS. 13A and 13B as an example, in order to keep the same DM RS overhead as the legacy DM RS pattern, the pattern of DM RS 1302 interlaced in frequency domain may be used for 4 SC-FDMA symbols.

Figure 14B:
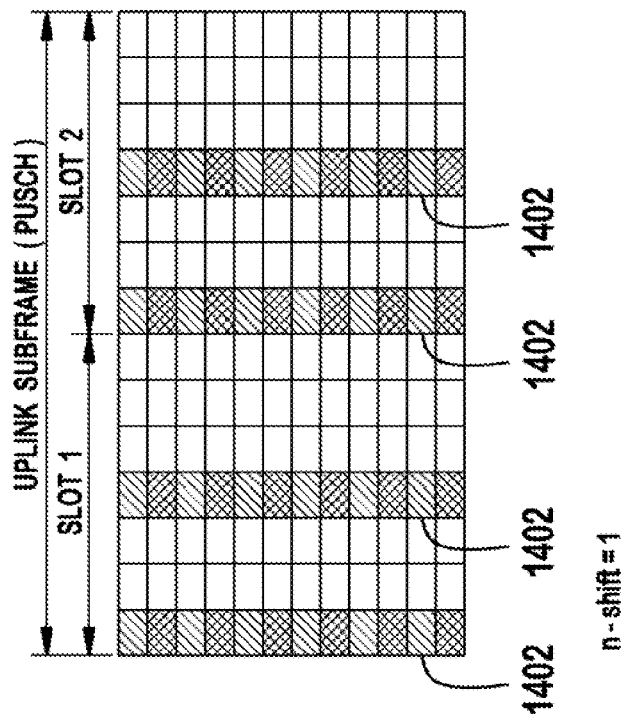
FIGS. 14A and 14B show different patterns of DM RS with a different shift in frequency domain, respectively.
Figure 14A:
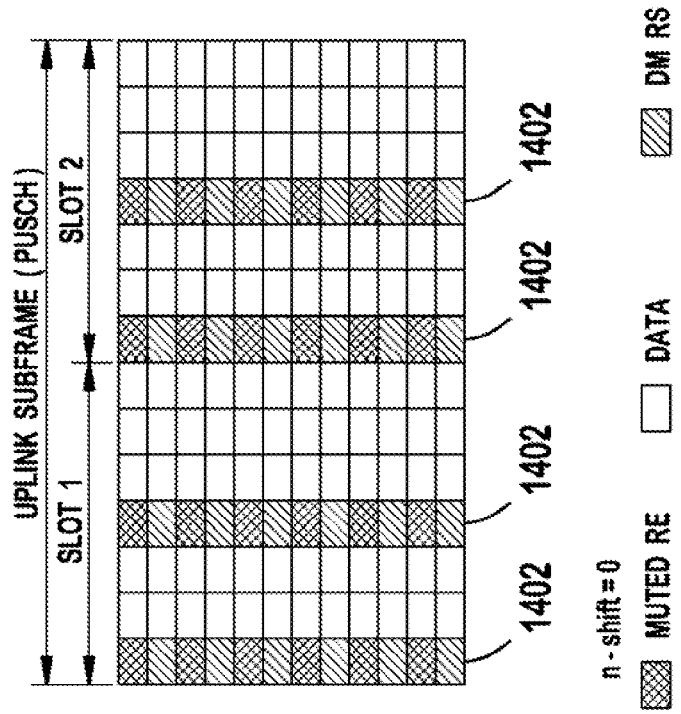

FIGS. 14A and 14B show different patterns of DM RS 1402 with a different shift (n-shift=0 or 1 in this example) in frequency domain, respectively. The data REs in the SC-FDMA symbols containing the DM RS 1402 may be muted as shown in FIGS. 14A and 14B. The muting may be used as a default or configured by higher layer signaling. By using the n-shift with muting, the DM RS capacity may be increased (e.g., doubled) so that a larger number of WTRUs may be co-scheduled with orthogonal DM RS. In addition, orthogonality between multiple WTRUs located in different cell may be supported.

Figure 15:
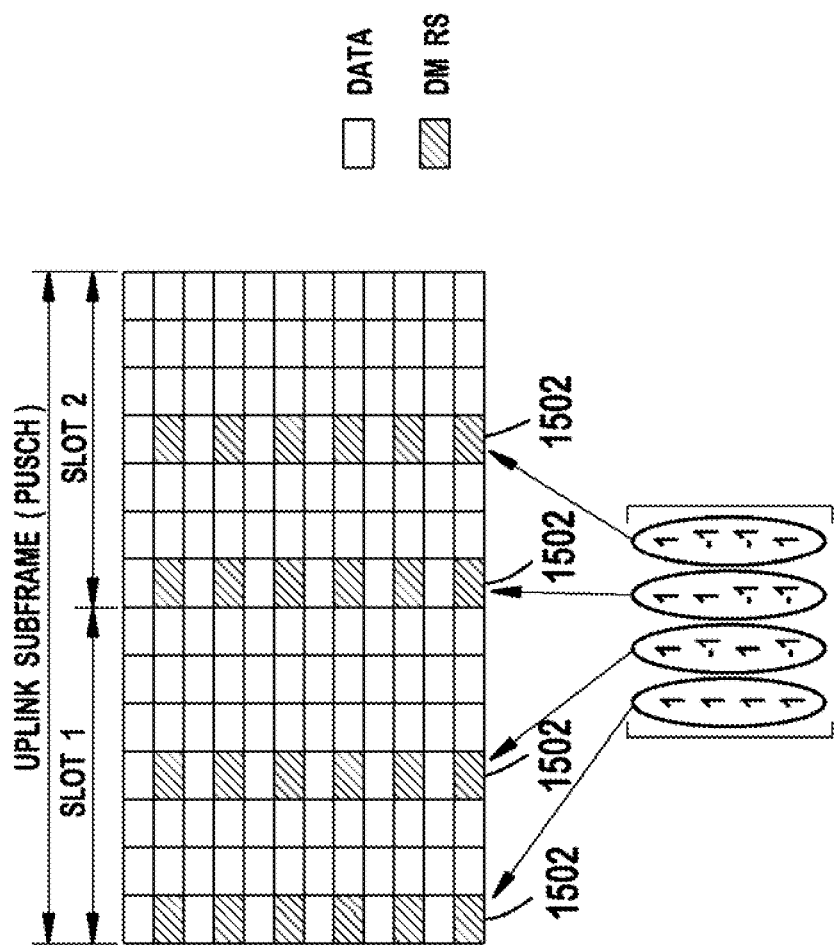
FIG. 15 shows an example of length-4 OCC mapping for the DM RS.

Since the DM RS is allocated with an interlaced pattern in an SC-FDMA symbol, the available number of cyclic shift of the base sequence of the DM RS may be reduced under the same channel delay spread. The number of orthogonal DM RS ports may be increased by using length-4 OCC mapping. FIG. 15 shows an example of length-4 OCC mapping for the DM RS 1502. The layer may be indicated by cyclic shift in combination with OCC.

The DM RS resource may be allocated dynamically via a PDCCH. Three parameters (cyclic shift, OCC, and n-shift) may be used to allocate the DM RS resources. Table 5 shows an example of the DMRS resource mapping.

TABLE 5

| Signaling bit | Cyclic shift and n-shift (α, μ) | | | | OCC | | | |
|---|---|---|---|---|---|---|---|---|
| | λ = 0 | λ = 1 | λ = 2 | λ = 3 | λ = 0 | λ = 1 | λ = 2 | λ = 3 |
| 000 | (0, 0) | (6, 0) | (9, 1) | (3, 1) | [+1 +1 +1 +1] | [+1 +1 +1 +1] | [+1 +1 +1 +1] | [+1 +1 +1 +1] |
| 001 | (6, 0) | (0, 0) | (3, 1) | (9, 1) | [+1 +1 −1 −1] | [+1 +1 −1 −1] | [+1 +1 −1 −1] | [+1 +1 −1 −1] |
| 010 | (3, 0) | (9, 0) | (6, 1) | (0, 1) | [+1 −1 +1 −1] | [+1 −1 +1 −1] | [+1 −1 +1 −1] | [+1 −1 +1 −1] |
| 011 | (4, 0) | (10, 0) | (7, 1) | (1, 1) | [+1 −1 −1 +1] | [+1 −1 −1 +1] | [+1 −1 −1 +1] | [+1 −1 −1 +1] |
| 100 | (2, 0) | (8, 0) | (5, 1) | (11, 1) | [+1 +1 +1 +1] | [+1 +1 +1 +1] | [+1 +1 +1 +1] | [+1 +1 +1 +1] |
| 101 | (8, 0) | (2, 0) | (11, 1) | (5, 1) | [+1 +1 −1 −1] | [+1 +1 −1 −1] | [+1 +1 −1 −1] | [+1 +1 −1 −1] |
| 110 | (10, 0) | (4, 0) | (1, 1) | (7, 1) | [+1 −1 +1 −1] | [+1 −1 +1 −1] | [+1 −1 +1 −1] | [+1 −1 +1 −1] |
| 111 | (9, 0) | (3, 0) | (0, 1) | (6, 1) | [+1 −1 −1 +1] | [+1 −1 −1 +1] | [+1 −1 −1 +1] | [+1 −1 −1 +1] |

Among the three parameters for the DM RS allocation, a subset of the three parameters may be used in the system. Alternatively, a subset of the parameters (e.g., cyclic shift and OCC) may be indicated by a PDCCH and other parameters (e.g., n-shift) may be indicated by higher layer signaling.

Figure 16:
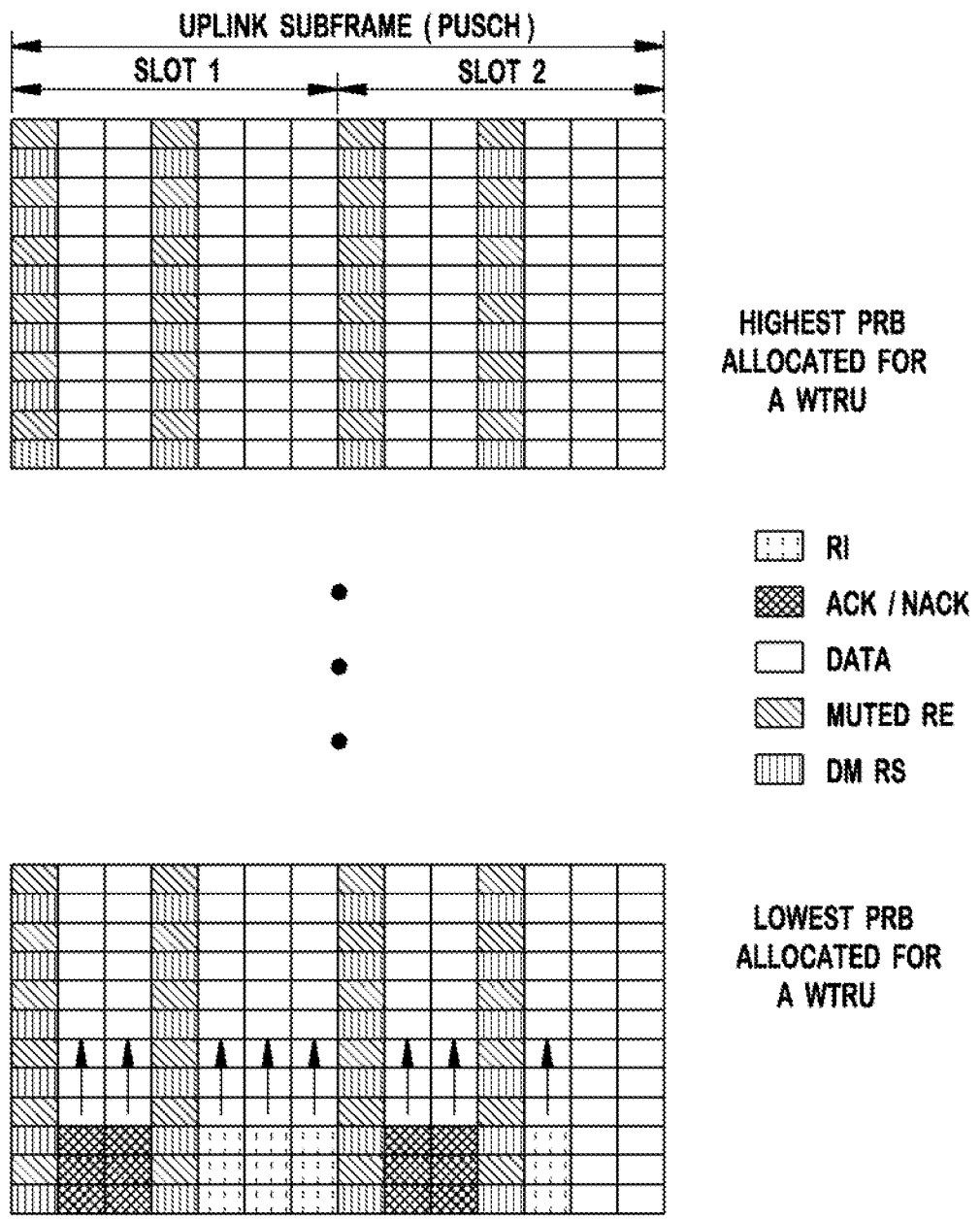
FIG. 16 shows an example uplink control information (UCI) multiplexing according to their priorities.
Figure 17:
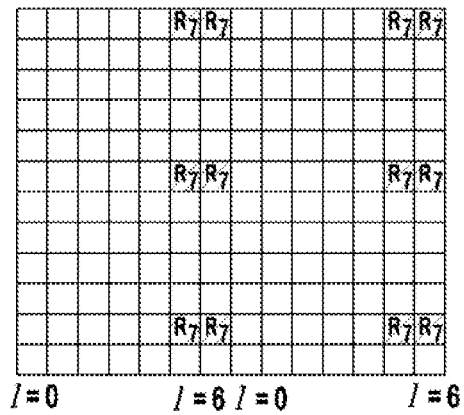
FIG. 17 shows a conventional WTRU-specific reference signal pattern for antenna ports 7, 8, 9, and 10 for normal cyclic prefix.
Figure 17:
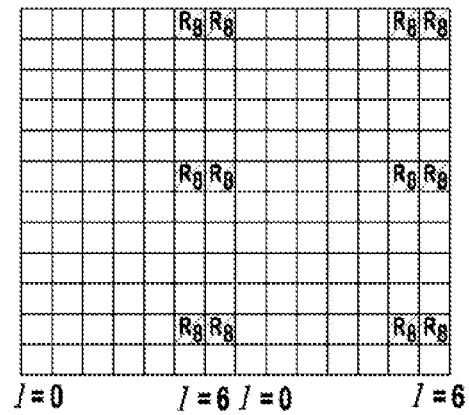
Figure 17:
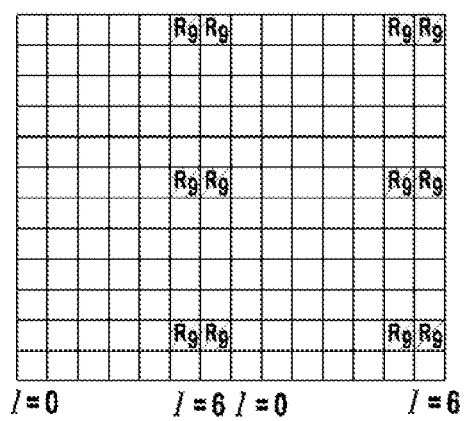
Figure 17:
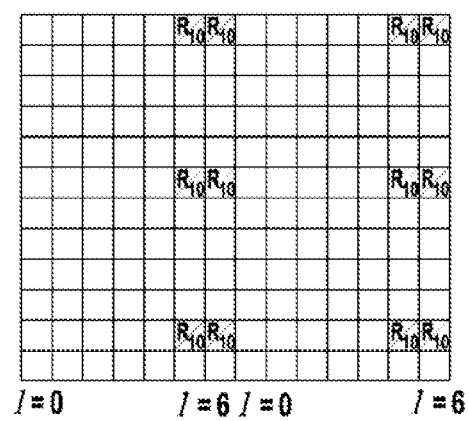

If a WTRU needs to transmit a PUCCH and a PUSCH in the same subframe, uplink control information (UCI) on the PUCCH may be piggybacked on the PUSCH in order not to increase cubic metric (CM) for the SC-FDMA transmission. The UCI includes hybrid automatic repeat request (HARQ) positive acknowledgement/negative acknowledgement (ACK/NACK), channel quality indicator (CQI), precoding matrix indicator (PMI), and rank indicator (RI). Among the UCIs, the HARQ ACK/NACK may have the highest priority so that it may be multiplexed in the time/frequency resources that may provide higher channel estimation accuracy. The RI may have a second highest priority since the misdetection of RI may lead misinterpretation of CQI/PMI information. The PMI/CQI may be multiplex with the same manner as in previous releases. The UCIs may be multiplexed according to their priorities. FIG. 16 shows an example UCI multiplexing according to their priorities.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for receiving multiple-input multiple-output (MIMO) transmissions, the method comprising:
   a wireless transmit/receive unit (WTRU) receiving at least one of a plurality of downlink transmissions from an eNodeB on at least one of a plurality of spatial layers, wherein the plurality of spatial layers are transmitted to a plurality of WTRUs for multi-user MIMO, and wherein the at least one spatial layer is used for reception by the WTRU;
   the WTRU receiving at least one WTRU-specific reference signal corresponding to the at least one downlink transmission; and
   the WTRU decoding the at least one downlink transmission based on the at least one corresponding WTRU-specific reference signal for the WTRU,
   wherein resource elements are allocated to resource blocks, and the resource blocks include WTRU-specific reference signals for the plurality of WTRUs and the downlink transmission such that WTRU-specific reference signals for different sub-groups of antenna ports are multiplexed onto different subcarriers in a frequency domain and the WTRU-specific reference signals of the same sub-group of antennas ports are each applied with a different orthogonal cover code in a time domain,
   wherein each sub-group of antenna ports includes at least two antenna ports, and
   wherein resource elements used for the downlink transmission are rate matched around resource elements allocated for the at least one WTRU-specific reference signal for the WTRU on at least one antenna port in one sub-group and are rate matched around resource elements allocated for at least one WTRU-specific reference signal for at least another WTRU on at least one antenna port in another sub-group, wherein the resource elements allocated for the at least one WTRU-specific reference signal for at least another WTRU are muted.

2. The method of claim 1 wherein the WTRU decodes the downlink transmission assuming that no data is transmitted to the WTRU on the muted resource elements.

3. The method of claim 1 wherein four antenna ports are used to support up to eight (8) layers.

4. The method of claim 1 wherein the WTRUs are paired for multi-user MIMO based on spatial correlation among the WTRUs.

5. The method of claim 1 wherein a bandwidth assigned for the WTRU is different from a bandwidth assigned for another WTRU for multi-user MIMO.

6. The method of claim 5 wherein the WTRU receives information regarding a largest bandwidth among the plurality of WTRUs for multi-user MIMO.

7. The method of claim 6 wherein the WTRU does not apply a scrambling sequence to the WTRU-specific reference signal on a condition that a bandwidth assigned to another WTRU for multi-user MIMO is different.

8. The method of claim 1 wherein the downlink transmission is received on two spatial layers used for reception by the WTRU.

9. A wireless transmit/receive unit (WTRU) comprising:
   a transceiver configured to receive at least one of a plurality of downlink transmissions from an eNodeB on at least one of a plurality of spatial layers, wherein the plurality of spatial layers are transmitted to a plurality of WTRUs for multi-user MIMO, and wherein the at least one spatial layer is used for reception by the WTRU;
   the transceiver configured to receive at least one WTRU-specific reference signal corresponding to the at least one downlink transmission; and
   a processor operatively coupled to the transceiver, the processor configured to decode the at least one downlink transmission based on the at least one corresponding WTRU-specific reference signal for the WTRU,
   wherein resource elements are allocated to resource blocks, and the resource blocks include WTRU-specific reference signals for the plurality of WTRUs and the downlink transmission such that WTRU-specific reference signals for different sub-groups of antenna ports are multiplexed onto different subcarriers in a frequency domain and the WTRU-specific reference signals of the same sub-group of antennas ports are each applied with a different orthogonal cover code in a time domain,
   wherein resource elements used for the downlink transmission are rate matched around resource elements allocated for the at least one WTRU-specific reference signal for the WTRU on at least one antenna port in one sub-group and are rate matched around resource elements allocated for at least one WTRU-specific reference signal for at least another WTRU on at least one antenna port in another sub-group, wherein the resource elements allocated for the at least one WTRU-specific reference signal for at least another WTRU are muted.

10. The WTRU of claim 9 wherein the processor is configured to decode the downlink transmission assuming that no data is transmitted to the WTRU on the muted resource elements.

11. The WTRU of claim 9 wherein four antenna ports are used to support up to eight (8) spatial layers.

12. The WTRU of claim 9 wherein the WTRUs are paired for multi-user MIMO based on spatial correlation among the WTRUs.

13. The WTRU of claim 9 wherein a bandwidth assigned for the WTRU is different from a bandwidth assigned for another WTRU for multi-user MIMO.

14. The WTRU of claim 13 wherein the processor and the transceiver are configured to receive information regarding a largest bandwidth among the plurality of WTRUs or multi-user MIMO.

15. The WTRU of claim 14 wherein the processor is configured to not apply a scrambling sequence to the WTRU-specific reference signal on a condition that a bandwidth assigned to another WTRU for multi-user MIMO is different.

16. The WTRU of claim 9 wherein the downlink transmission is received on two spatial layers used for reception by the WTRU.

* * * * *